United States Patent
Bitra et al.

(10) Patent No.: US 10,111,077 B1
(45) Date of Patent: Oct. 23, 2018

(54) SYSTEM AND METHOD FOR ENABLING MOBILE DEVICE LOCATION SERVICES DURING AN EMERGENCY CALL

(71) Applicant: QUALCOMM Incorporated, San Diego, CA (US)

(72) Inventors: Suresh Kumar Bitra, Mangalagiri (IN); Sreekanth Hosahudya Venkataramanappa, Hyderabad (IN); Kirk Allan Burroughs, Alamo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/491,681

(22) Filed: Apr. 19, 2017

(51) Int. Cl.
| | |
|---|---|
| H04W 88/06 | (2009.01) |
| H04L 12/931 | (2013.01) |
| H04W 4/90 | (2018.01) |
| H04W 40/00 | (2009.01) |
| H04W 36/14 | (2009.01) |
| H04W 4/02 | (2018.01) |
| H04L 12/28 | (2006.01) |

(52) U.S. Cl.
CPC ............. *H04W 4/90* (2018.02); *H04W 4/025* (2013.01); *H04W 36/14* (2013.01); *H04W 40/005* (2013.01); *H04L 12/2854* (2013.01); *H04L 49/351* (2013.01); *H04W 88/06* (2013.01)

(58) Field of Classification Search
CPC ....... H04W 4/22; H04W 88/06; H04W 64/00; H04W 4/023; H04W 4/025; H04W 88/02; H04W 76/007; H04W 84/12; H04W 88/08; H04W 16/14
See application file for complete search history.

(56) References Cited

U.S. PATENT DOCUMENTS

| | | | |
|---|---|---|---|
| 8,311,557 B2 | 11/2012 | Annamalai | |
| 8,442,481 B2 | 5/2013 | Maier et al. | |
| 8,867,411 B2 | 10/2014 | Ionescu et al. | |
| 9,271,116 B1 | 2/2016 | Li et al. | |
| 2005/0232189 A1* | 10/2005 | Loushine | H04W 64/00 370/328 |
| 2007/0149211 A1* | 6/2007 | Dunn | H04W 4/02 455/456.1 |
| 2011/0064046 A1 | 3/2011 | Zhu | |
| 2012/0295623 A1 | 11/2012 | Siomina et al. | |
| 2013/0016696 A1 | 1/2013 | Adjakple et al. | |
| 2016/0150574 A1 | 5/2016 | Edge et al. | |
| 2016/0345262 A1* | 11/2016 | Jain | H04W 52/02 |

OTHER PUBLICATIONS

International Search Report and Written Opinion—PCT/US2018/025268—ISA/EPO—dated Jun. 28, 2018.

\* cited by examiner

*Primary Examiner* — Kwasi Karikari
(74) *Attorney, Agent, or Firm* — Kilpatrick Townsend & Stockton (57) ABSTRACT

Disclosed is a method and apparatus enabling positioning processes performed by user equipment. The method may include initiating a voice call over a first wireless communications network using a first radio access technology (RAT). The method may also include a connection between the user equipment and a second wireless communications network using a second RAT being placed into an idle state. The method may also include participating in a control plane positioning process with the second wireless communications network during the voice call over the first wireless communications network.

26 Claims, 5 Drawing Sheets

SYSTEM AND METHOD FOR ENABLING MOBILE DEVICE LOCATION SERVICES DURING AN EMERGENCY CALL

FIELD

The subject matter disclosed herein relates generally to positioning processes performed by user equipment.

BACKGROUND

Sometimes it is desirable to determine the location of a mobile device, such as a cellular telephone. For example, when the mobile device places an emergency call to a public safety answering point (PSAP), the PSAP will want to know the mobile device's current location in the event the user of the mobile device is unable to provide their current location, or is otherwise incapacitated. A complication arises for mobile devices with the ability to initiate voice calls over either a cellular communication network (e.g., a third generation partnership project (3GPP) communications network, such as a global system for mobile communications (GSM) network or other wireless wide area network (WWAN)), or a wireless local area network (e.g., WLAN) using voice over IP over the WLAN. Typically, due to cost considerations, mobile device settings, and/or carrier preferences, when WLAN is available to a user, a voice call will be established and routed over the WLAN network. To determine the mobile device's location, an IP based positioning process, such as secure user plane location (SUPL), must be initiated over the WLAN network. However, many mobile device manufacturers and/or carrier networks do not support user plane positioning over the WLAN network. Thus, a positioning process initiated as a result of an emergency call would fail.

DETAILED DESCRIPTION

The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

Figure 1:
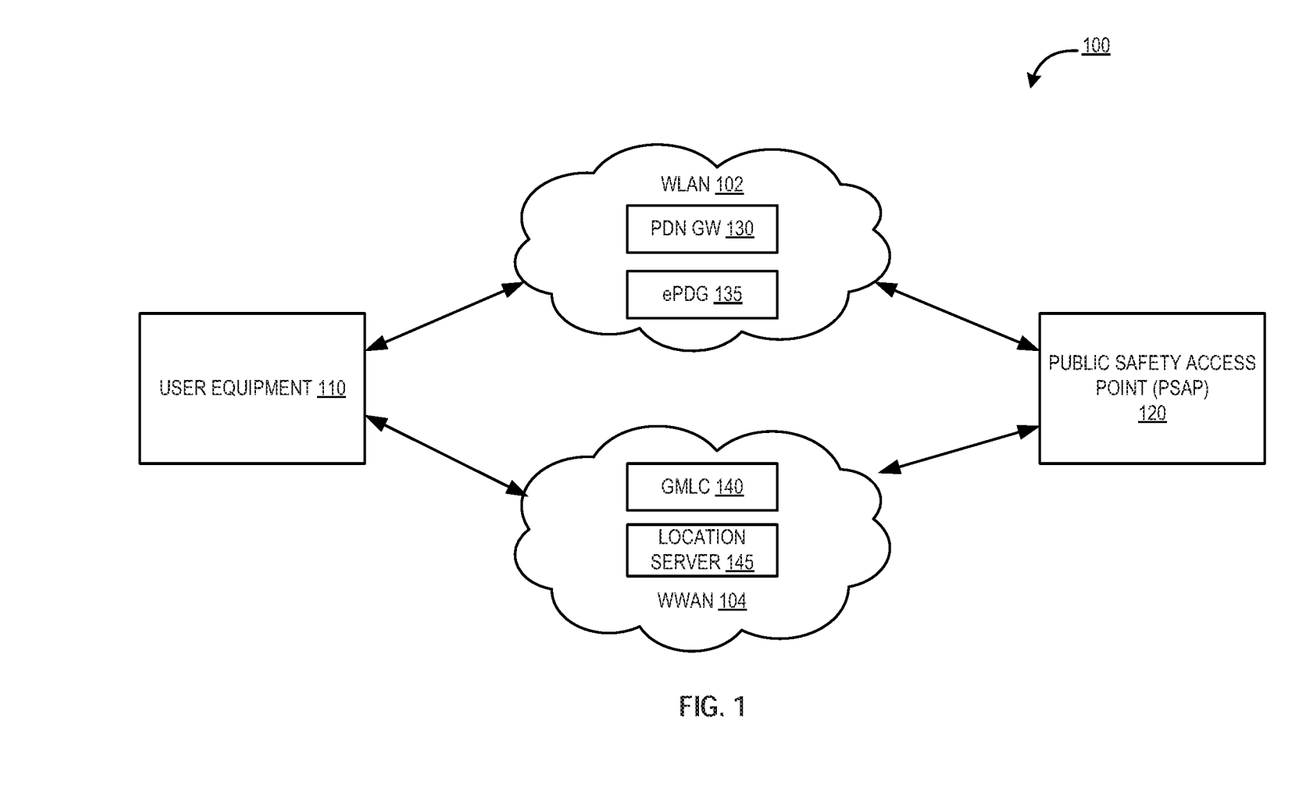
FIG. 1 is a block diagram of an exemplary system architecture for providing location services during an emergency voice call over a wireless communications network are described.

FIG. 1 is a block diagram of an exemplary system architecture 100 for providing location services during an emergency voice call over a wireless communications network are described.

In one embodiment, user equipment 110 is a mobile communications device, such as a mobile telephone, smartphone, etc. that may communicatively couple with a first wireless communications network (e.g., wireless local area network (WLAN) 102) using a first radio access technology (RAT). Although a WLAN is illustrated in FIG. 1, other local communications networks can be utilized as the first wireless communication network, such as a mesh network, a peer-to-peer network, personal area networks, a Long-Term Evolution Direct network, a VLC network, a wireless wide area small cell network, or any combination of local networks, consistent with the discussion herein. User equipment 110 may communicatively couple with a second wireless communication network (e.g., wireless wide area network (WWAN) 104) using a second RAT different from the first RAT. However, in embodiments, user equipment may communicatively couple with both radio based communication networks. Furthermore, user equipment 110 is capable of placing voice calls over WLAN 102 using, for example, voice over internet protocol (VoIP) or other WLAN technologies. User equipment is also capable of placing voice calls over wireless WWAN 104 using, for example, a standard of cellular communications (e.g., Long-Term Evolution (LTE) telecommunications standard based on Global System for Mobile Communications (GSM)). However, due to user preferences settings on user equipment 110, based on perceived call quality and/or monetary efficiency, due to carrier network policies that offload mobile data from WWAN 104 to WLAN 102 (e.g., an Access Network Discovery and Selection Function (ANDSF) policy), etc., when WLAN 102 is available to the user equipment 110, the user equipment will automatically initiate and place voice calls over the WLAN 104 network.

In one embodiment, such offloading of mobile data to WWAN 104 for placing and processing of the voice call does not entirely disconnect the communications link between user equipment 110 and WWAN 104. During the voice call over the WLAN 102, user equipment 110 remains camped/registered with the WWAN (e.g., the LTE cellular communication network). However, in response to the data offloading to the WLAN 102 for handling the voice call, user equipment 110 places its WWAN communications capabilities in an idle mode. Furthermore, in embodiments discussed below, it is assumed that user equipment 110, a carrier network that provides WWAN 104, or both, do not support positioning services over WLAN 102 (e.g., SUPL). Thus, positioning during a WLAN based voice call would fail.

In one embodiment, user equipment 110 places an emergency call to public safety access point (PSAP) 120. PSAP 120 is a call center system responsible for answering calls placed to an emergency telephone number, such as 911, 999, 000, etc. Because WLAN 102 is available to user equipment 110, user equipment 110 places the emergency call over WLAN 102 using the first RAT. In embodiments, the emergency call is an e911 call utilizing VoIP over WLAN 104, which places the WWAN communication capabilities of user equipment 110 in an idle mode.

In one embodiment, in response to a request to initiate a control plane positioning process received from a carrier network (e.g., WWAN 104), user equipment 110 moves from the idle mode to a location mode and engages in a control plane positioning process with WWAN 104. In embodiments, the movement of the user equipment 110 from an idle mode to a location mode allows for transmission and reception of location related signals to and from user equipment 110. However, the location mode is not a full traffic or active WWAN mode that can be used for transmission and reception of user data (e.g., call or other user data). That is, user equipment 110 simultaneously engages in the emergency voice call over WLAN 102 using the first RAT per the preferences of the user equipment, network policies, etc., and also simultaneously engages in a control plane positioning process with a carrier network (e.g., WWAN 104) to which the user equipment 110 is a subscriber using the second RAT. In one embodiment, the control plane positioning process is a network initiated location request (NILR) positioning process initiated by WWAN 104 that moves the user equipment 110 from a WWAN idle mode to a WWAN location mode, and results in WWAN 104 and user equipment 110 exchanging a series of control plane messages over a network signaling connection. In embodiments, the series of control plane messages may include WWAN 104 sending user equipment 110 unsolicited assistance data, instructions to determine its own position, etc.

Based on results of the control plane positioning process, user equipment's 110 current position may be communicated to the PSAP 120 from WWAN 104. Thus, PSAP 120 is able to obtain the user equipment's 110 current location even when the user equipment 110, carrier network policies, or both do not support user plane positioning (e.g., SUPL) over the WLAN 102 during a voice call over WLAN 102.

In one embodiment of providing location services during an emergency call placed over WLAN 102, user equipment 110 utilizes a PDN gateway 130 to connect with WLAN 102. In one embodiment, PDN gateway 130 is a component of WLAN network 102 that provides a trusted access point of a WLAN network to the subscribers of the carrier network that provides WLAN 102 (e.g., a trusted non-3GPP WLAN access point provided by the telecommunications service to which user equipment 110 subscribes). In this embodiment, the PDN gateway 130 informs the PSAP 120 of the user equipment's international mobile subscriber identity (IMSI)/ International Mobile Equipment Identity (IMEI) information. In one embodiment, the PDN gateway 130 is able to determine the IMSI/IMEI information based on access to subscriber information from the carrier. Additionally, the notification from the PDN gateway 130 to the PSAP 110 also includes a carrier network identification corresponding to the carrier network that provides the PDN gateway 130 and trusted WLAN (e.g., WLAN 102). Thus, the PDN gateway 130 identifies to the PSAP 120 the specific user equipment 110 that placed the call (e.g., using the IMSI/IMEI) and the specific carrier network to which the user equipment is a subscriber.

In one embodiment, PSAP 120 utilizes these identifiers to contact a gateway mobile location center (GMLC) 140 of the identified carrier network (e.g., WWAN 104). In one embodiment, GMLC 140 is a component of a WWAN 104 that serves as a gateway between the user equipment 110 and the PSAP 120. Furthermore, GMLC 140 is responsible for invoking location server 145, which is another component of WWAN 104 that supports location based services for its carrier network. In embodiments, location server 145 provides a WWAN specific position process, such as LTE positioning protocol (LPP) positioning in an LTE WWAN, radio resource location services protocol (RRLP) positioning in a GSM WWAN, radio resource control (RRC) protocol positioning in a WCDMA WWAN, IS-801 standard positioning in a CDMA WWAN, etc. In one embodiment, the IMSI/IMEI information (e.g., the mobile device identifier for the device placing the emergency call) is provided from the PSAP 120 to location server 145. The location server 145 utilizes the IMSI/IMEI information to initiate a control plane positioning process, such as a control plane assisted global positioning process (AGPS) performed over WWAN 104 (e.g., the carrier's LTE network to which the user equipment 110 is camped/connected). Furthermore, the control plane positioning process is performed simultaneously (e.g., as a background process performed by the user equipment 110 with WWAN communication in a location mode). The control plane positioning process includes the location server 145 signaling user equipment 110 from WWAN 104, obtaining responses, and determining the user equipment's 110 current location. This location is then provided back to the PSAP 120 from GMLC 140 to provide a real time location of the user equipment participating in an emergency call with the PSAP 120 over the WLAN 102.

In another embodiment for providing location services during an emergency call placed over WLAN 102, user equipment 110 utilizes evolved packet data gateway (ePDG) 135 to place the emergency call to a PSAP 120. In contrast to the embodiment discussed above, ePDG 135 is a non-trusted WLAN access point that can be used by user equipment 110 when user equipment is not a subscriber of the telecommunications system that provides WLAN 102. In one embodiment, ePDG 135 has a communications link to PDN gateway 130 that in turn can establish a communications link with PSAP 120, similar to the discussion above. However, in this embodiment, PDN gateway 130 and/or the PSAP 120 derive a carrier network identification from an IP address in the communications traffic exchanged between user equipment 110 and ePDG 135. For example, from the IP address of the ePDG 135, the carrier to which the user equipment is a subscriber can be identified. After the carrier network identifier is determined, similar to the embodiment discussed above, the user equipment's IMSI/IMEI information and the carrier identification are provided to the PSAP 120 for initiating the control plane positioning process to be carried out by location server 145 of the user equipment's carrier network (e.g., WWAN 104).

In either embodiment discussed above, the location of user equipment 110 can be determined during a VoIP over WLAN voice call, even when user equipment 110 and/or a WLAN network do not support WLAN based position processes (e.g., SUPL). Furthermore, although the discussion above noted that the control plane positioning could be initiated in response to an emergency call routed over WLAN, the control plane positioning method could be utilized for other purposes to determine the user equipment's location during a VoIP over WLAN voice call, or other scenario, that places WWAN capabilities of user equipment 110 in an idle state.

Figure 2:
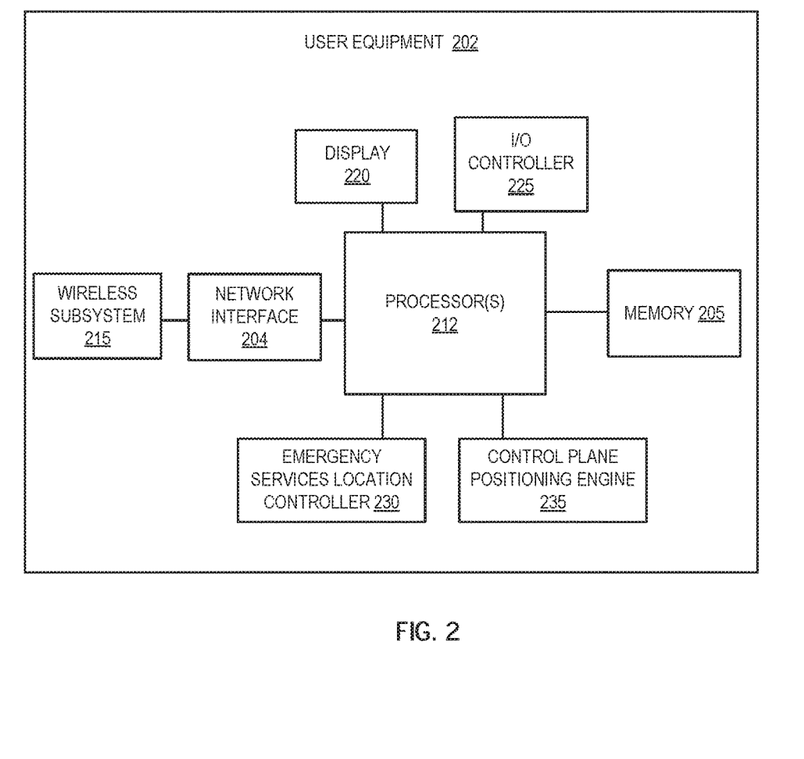
FIG. 2 is block diagram of one embodiment of user equipment.

FIG. 2 is block diagram of one embodiment of user equipment 202. User equipment 202 provides additional details for user equipment 110 discussed above in FIG. 1.

In one embodiment, user equipment 202 is a system, which may include one or more processors 212, a memory 205, I/O controller 225, network interface 204, and display 220. User equipment 202 may also include a number of processing modules, which may be implemented as hardware, software, firmware, or a combination, such as emergency services location controller 230 and control plan positioning engine 235. It should be appreciated that user equipment 202 may also include, although not illustrated, a user interface (e.g., one or more microphones, keyboard, touch-screen, or similar devices), a power device (e.g., a battery), as well as other components typically associated with electronic devices. Although only a single wireless subsystem 215 is illustrated, it is understood that network interface 204 may simultaneously be coupled to any number of wireless subsystems 215 (e.g., Bluetooth, WiFi, Cellular, or other networks) to transmit and receive data streams through a wireless link to/from the corresponding network.

Network interface 204 may also be a wired interface for direct connection to networks (e.g., the Internet, Ethernet, or other wireless systems).

In one embodiment, wireless subsystem 215 couples user equipment 202 to a WLAN (e.g., WLAN 102) using, for example, the IEEE 802.11 standard for the exchange of information with the WLAN. Wireless subsystem 215 also couples user equipment 202 to a WWAN (e.g., WWAN 104) using, for example, GSM, LTE, WCDMA, CDMA, or other standard for the exchange of information using mobile communications technology. Furthermore, as discussed above, when the wireless subsystem of user equipment 202 connects to a WLAN, a WWAN connection to a WWAN network to which user equipment 202 is camped is placed in idle mode. This switch to idle mode for the WWAN connection and WWAN processes is performed based one or more of user preferences set within user equipment 102, network provider policies (ANDSF policie(s)), or a combination.

Memory 205 may be coupled to processor 212 to store instructions for execution by processor 212. In some embodiments, memory 205 is non-transitory. Memory 205 may also store one or more processing modules (i.e., emergency services location controller 230 and control plane positioning engine 235) to implement embodiments described herein. It should be appreciated that embodiments of the invention as described herein may be implemented through the execution of instructions, for example as stored in the memory 205 or other element, by processor 212 of user equipment 202 and/or other circuitry of user equipment 202 and/or other devices. Particularly, circuitry of user equipment 202, including but not limited to processor 212, may operate under the control of a program, routine, or the execution of instructions to execute methods or processes in accordance with embodiments of the invention. For example, such a program may be implemented in firmware or software (e.g. stored in memory 205 and/or other locations) and may be implemented by processors, such as processor 212, and/or other circuitry of user equipment 202. Further, it should be appreciated that the terms processor, microprocessor, circuitry, controller, etc., may refer to any type of logic or circuitry capable of executing logic, commands, instructions, software, firmware, functionality and the like.

Further, it should be appreciated that some or all of the functions, engines or modules described herein may be performed by user equipment 202 itself and/or some or all of the functions, engines or modules described herein may be performed by another system connected through I/O controller 225 or network interface 204 (wirelessly or wired) to user equipment 202. Thus, some and/or all of the functions may be performed by another system and the results or intermediate calculations may be transferred back to user equipment 202. In some embodiments, such other device may comprise a server (not shown). In some embodiments, the other device is configured to predetermine the results, for example, based on a known configuration of the user equipment 202.

In one embodiment, wireless subsystem 215 couples user equipment 202 to a WLAN (e.g., WLAN 102) using a first RAT, for example, IEEE 802.11 standards for the exchange of information over a WLAN communications network. Wireless subsystem 215 also couples user equipment 202 to a WWAN (e.g., WWAN 104) using a second RAT, for example, GSM, LTE, WCDMA, CDMA, or other standard for the exchange of information using mobile communications technology. Furthermore, as discussed above, when the wireless subsystem of user equipment 202 connects to a WLAN (e.g., to place a voice call or exchange other data over the WLAN network), a WWAN connection to a WWAN network to which user equipment 202 is camped is placed in an idle mode. This switch to idle mode for the WWAN connection and WWAN processes is performed based one or more of user preferences set within user equipment 202, network provider policies (ANDSF policie(s)), or a combination.

In one embodiment, emergency services location controller 230 is responsible for detecting that an emergency call has been placed on user equipment 202. For example, emergency services location controller 230 may detect the dialing of a specific telephone number (e.g., 911, 999, 000, or other number) to establish voice communication with a PSAP (e.g., PSAP 120 of FIG. 1). Furthermore, in one embodiment, when a WLAN network is available to user equipment, the WLAN network will be utilized to carry the emergency call using, for example, VoIP over WLAN. As a result, the WWAN capabilities of user equipment are placed in an idle mode. Furthermore, it is assumed herein that due to user equipment 202 capabilities, WLAN network capabilities, or other factors, location services over the WLAN network (e.g., SUPL) are not available to determine a location of user equipment 202.

Therefore, in one embodiment, control plane positioning engine 235, upon detecting the emergency call over a WLAN communications link, ensures that user equipment 202 will be able to participate in a control plane positioning process with a location server (not shown) of a carrier network to which user equipment 202 subscribes. In one embodiment, the control plane positioning engine 235 wakes and/or otherwise configures the control plane positioning engine 235 for engaging in a control plane positioning process, such as a NILR control plane positioning process, by moving the user equipment 202 from a WWAN idle mode to a WWAN location mode. In one embodiment, the movement of user equipment 202 from the idle mode to the location mode is initiated by control plane positioning engine 235 in response to receipt of one or more messages from the location server (e.g., at the initiation of a WWAN positioning process). As discussed above, control plane positioning engine 235 receives one or more communications from a location server over a control plane signaling channel, which are used by the user equipment 202 and the location server to perform a control plane positioning process. As discussed above, one or more identifiers of the user equipment 202 are provided from a PSAP handling the WLAN emergency call (either from a PDN or extracted from an ePDG) to a GMLC, which in turn provides the identifiers to the location server. The location server then uses the identifiers to initiate the control plane positioning process with the appropriate user equipment 202.

In one embodiment, the control plane positioning engine 235 participates in the exchange of the positioning messages using a signaling channel of the WWAN network that includes the location server. Furthermore, the control plane positioning engine 235 may exchange these messages while user equipment is in the location mode. As discussed herein, user equipment 202 is able to transmit and receive location related control plane messages, but not user data, while user equipment is in the location mode. These control plane positioning messages are exchanged during the positioning process simultaneously with the user participating in the emergency call with the PSAP over a WLAN voice connection. Therefore, even though the emergency call is routed over a WLAN network connection, and the WLAN network and/or user equipment do not have WLAN based positioning capabilities, the utilization of the control plane positioning enables user equipment's 202 location to be determined. Furthermore, user equipment 202 participates in the emergency voice call over the WLAN network using, for example VoIP over WLAN communication techniques, simultaneously with the control plane positioning being performed in conjunction with a WWAN network. As a result, the voice portion of the emergency call can continue using the WLAN network and the position of the mobile device determined using the services of a different network.

Figure 3:
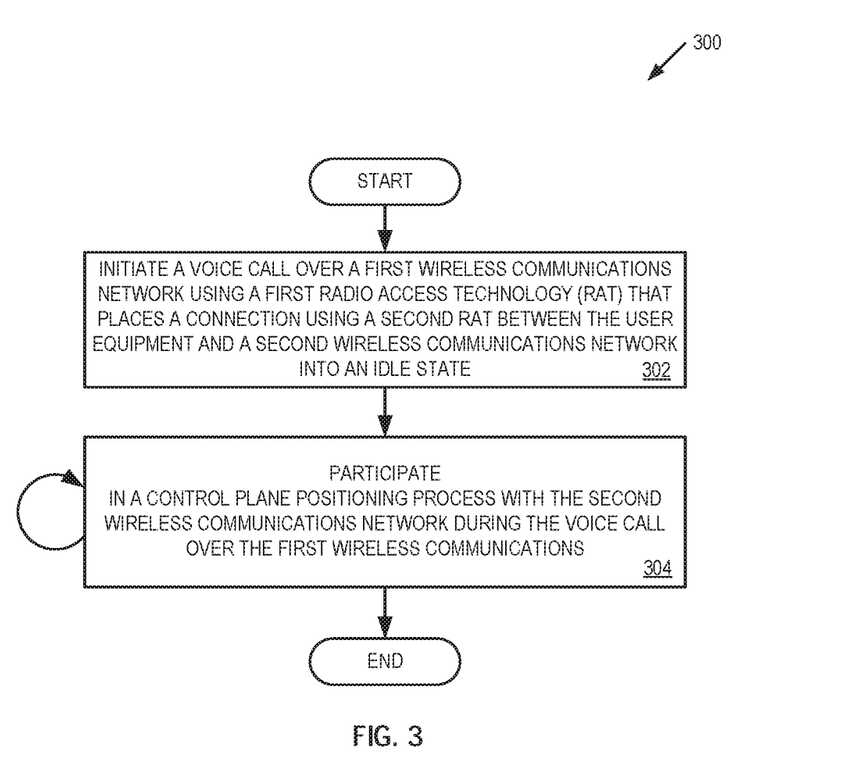
FIG. 3 is a flow diagram of one embodiment of a method 300 for enabling mobile device location services of a second wireless communication network during an emergency call over a first wireless communications network.

FIG. 3 is a flow diagram of one embodiment of a method 300 for enabling mobile device location services of a second wireless communication network during an emergency call over a first wireless communications network. The method 300 is performed by processing logic that may comprise hardware (circuitry, dedicated logic, etc.), software (such as is run on a general purpose computer system or a dedicated machine), firmware, or a combination. In one embodiment, the method 300 is performed by a mobile device (e.g., user equipment 110 or user equipment 202).

Referring to FIG. 3, processing logic begins by initiating a voice call over a first wireless communications network using a first radio access technology (RAT), where a connection between the user equipment and a second wireless communications network using a second RAT is placed into an idle state (processing block 302). As discussed herein, the first wireless communications network may be a local network (e.g., WLAN, mesh network, peer-to-peer network, LTE-D network, VLC network, WWAN small cell network, etc.) in which local transmissions are exchanged between the user equipment the local network using an associated RAT protocol. Furthermore, the second wireless communication network may be a mobile device's carrier network (e.g., a WWAN). In embodiments, user equipment may have preferences set by a user and/or by the carrier network provider to use a local communications network (e.g., WLAN, mesh network, etc.) whenever available. Furthermore, upon using the local network to exchange data for a call, the WWAN capabilities and connection would be placed in an idle state, although the user equipment would remain camped (e.g., subscribed) to the carrier network for later use of a WWAN connection should the local communications connection be lost.

Processing logic then participates in a control plane positioning process with the second wireless communication network during the voice call over the first wireless communication network (processing block 304). In one embodiment, processing logic performs the control plane positioning process with systems of the carrier WWAN network, such a GMLC that servers as a gateway to a PSAP and a WWAN location server that provides location services within the WWAN network. Furthermore, processing logic moves the user equipment from the idle state to a location state, which as described herein, is a limited communications state between the user equipment and the WWAN that enables the transmission and exchange of control plane positioning messages. In embodiments processing logic performs the control plane positioning process as a background process so that the voice call over the local network can proceed simultaneously with the location process performed using the WWAN network. In other words, processing logic can perform device positioning and the voice call over different access networks simultaneously.

Figure 4:
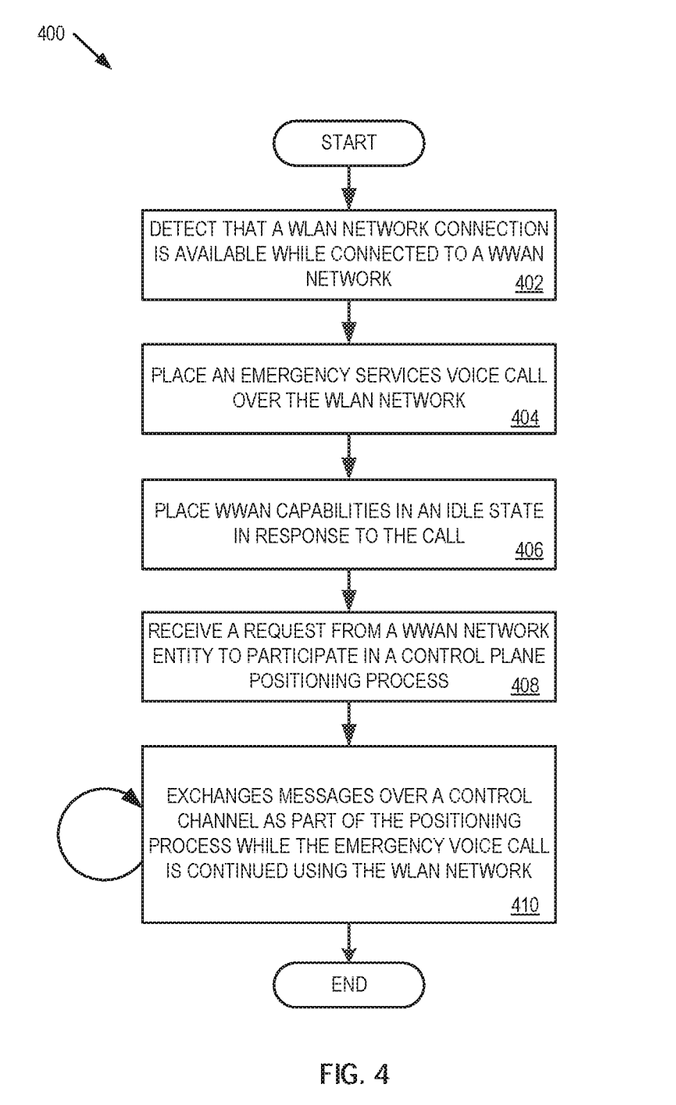
FIG. 4 is a flow diagram of an embodiment of a method for enabling mobile device location services during an emergency call over a WLAN.

FIG. 4 is a flow diagram of an embodiment of a method 400 for enabling mobile device location services during an emergency call over a WLAN. The method 400 is performed by processing logic that may comprise hardware (circuitry, dedicated logic, etc.), software (such as is run on a general purpose computer system or a dedicated machine), firmware, or a combination. In one embodiment, the method 400 is performed by a mobile device (e.g., user equipment 110 or user equipment 202).

Referring to FIG. 4, processing logic begins by detecting that a WLAN network connection is available to user equipment while the user equipment is connected to a WWAN network (processing block 402). For example, the user equipment may continually or periodically scan for available WLAN networks within range of the user equipment. The user equipment then places an emergency services voice call over the WLAN network (processing block 404). In one embodiment, the WLAN network is used by the processing logic of the user equipment based on one or more user preferences (e.g., preferences to use WLAN due to cost, speed, etc.), based on one or more carrier preferences (e.g., preferences set by a carrier network and communicated to the user equipment based on network congestion, to allow connection to alternative networks, etc.), other preferences, or any combination thereof. As a result of placing the call over the WLAN network, processing logic places the WWAN capabilities in an idle state (processing block 406) to avoid excess power consumption, needless data exchange, etc. that would result with two redundant interfaces. However, the user equipment remains camped/registered with the WWAN even while in idle state for the exchange of various beacons, control signals, etc. from the WWAN network.

Processing logic then receives a request from a WWAN network entity to participate in a control plane positioning process (processing block 408). In one embodiment, the user equipment is transitioned from the idle state to a location state so that the control plane positioning process can be performed over WWAN while the voice call is processed using the WLAN network. The state transition of the user equipment and the resulting control plane positioning may occur in response to a network initiated location request from a WWAN location server of a carrier network to which the user equipment subscribes. The positioning process may then include the location server and the user equipment exchanging control plane messages, assistance data, positioning estimates, etc. over a control channel as part of the positing process while the emergency voice call continues (processing block 410). The exchange of control plane messages occurs in the background and may be processed by processing logic in parallel with the processing of the voice call over the WLAN network. Furthermore, the control plane messages exchanged with the location occur while the user equipment is in a location state, which is a limited messaging state that does not enable the exchange of user data. Thus, even when user equipment uses a WLAN network to place a voice call, and WLAN positioning is not available during the call (e.g., due to device and/or network limitations), the mobile device's position can still be determined during the voice call using control plane positioning.

Figure 5:
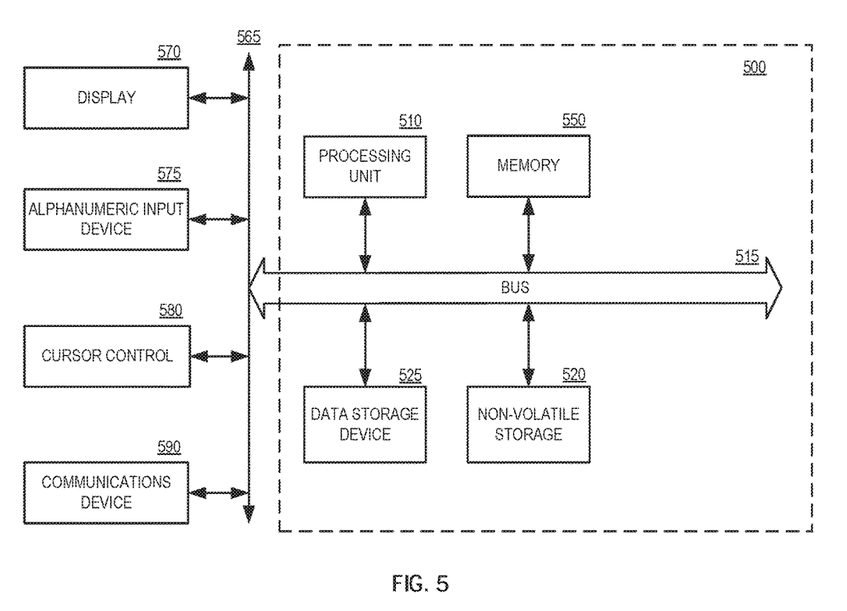
FIG. 5 is a block diagram of a processing system.

FIG. 5 is one embodiment of a system that may be used as a computing device, such as the user equipment, PSAP, GMLC, location server, ePDG, or PDN GW discussed above in FIG. 1. It will be apparent to those of ordinary skill in the art, however that other alternative systems of various system architectures may also be used.

The system illustrated in FIG. 5 includes a bus or other internal communication means 515 for communicating information, and a processor 510 coupled to the bus 515 for processing information. The system further comprises a random access memory (RAM) or other volatile storage device 550 (referred to as memory), coupled to bus 515 for storing information and instructions to be executed by processor 510. Main memory 550 also may be used for storing temporary variables or other intermediate information during execution of instructions by processor 510. The system also comprises a read only memory (ROM) and/or static storage device 520 coupled to bus 515 for storing static information and instructions for processor 510, and a data storage device 525 such as a solid state, magnetic, optical, etc. storage device. Data storage device 525 is coupled to bus 515 for storing information and instructions.

The system may further be coupled to a display device 570, such as a light emitting diode (LED), a liquid crystal display (LCD), interferometric modulator display (IMOD), etc., coupled to bus 515 through bus 565 for displaying information to a user. An alphanumeric input device 575, including alphanumeric and other keys, may also be coupled to bus 515 through bus 565 for communicating information and command selections to processor 510. An additional user input device is cursor control device 580, such as a touchscreen display underlay, touchpad, or stylus coupled to bus 515 through bus 565 for communicating direction information and command selections to processor 510.

Another device coupled to system 500 is a communication device 590 for accessing other nodes of a distributed system via a network, such as via LAN, WAN, or other networks. The communication device 590 may include any of a number of commercially available networking devices, such as those used for coupling to an Ethernet, token ring, Internet, or wide area network. Note that any or all of the components of this system illustrated in FIG. 5 and associated hardware may be used in various embodiments.

It will be appreciated by those of ordinary skill in the art that any configuration of the system may be used for various purposes according to the particular implementation. The control logic or software implementing the systems and methods discussed herein can be stored in main memory 550, mass storage device 525, or other storage medium locally or remotely accessible to processor 510.

It will be apparent to those of ordinary skill in the art that the system, method, and process described herein can be implemented as software stored in main memory 550 or read only memory 520 and executed by processor 510. This control logic or software may also be resident on an article of manufacture comprising a non-transitory computer readable medium having computer readable program code embodied therein and being readable by the mass storage device 525 and for causing the processor 510 to operate in accordance with the methods and teachings herein.

The systems and methods discussed herein may also be embodied in a handheld, portable, or multimedia device containing a subset of the hardware components described above. For example, a handheld or portable device may be configured to contain only the bus 515, the processor 510, and memory 550 and/or 525. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation for such a device would be apparent to one of ordinary skill in the art given the disclosure of the systems and methods as provided herein.

The systems and methods discussed herein may also be embodied in a special purpose appliance, such as network communication device, including a subset of the hardware components described above. For example, the appliance may include a processor 510, a data storage device 525, a bus 515, and memory 550, and only rudimentary communications mechanisms, such as a small touch-screen or remote control that permits the user to communicate in a basic manner with the device. In general, the more special-purpose the device is, the fewer of the elements need be present for the device to function.

It should be appreciated that the user equipment, network devices, and PSAP discussed herein may communicate via one or more wireless communication links through a wireless network that are based on or otherwise support any suitable wireless communication technology. For example, the user equipment and array mobile device(s) may associate with a network including a wireless network. In some aspects the network may comprise a local area network or a wide area network. Furthermore, the user equipment and array mobile device(s) may support or otherwise use one or more of a variety of wireless communication technologies, protocols, or standards such as, for example, CDMA, TDMA, OFDM, OFDMA, WiMAX, and Wi-Fi.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for enabling positioning processes performed by user equipment, the method comprising:
    initiating, by the user equipment, a voice call over a first wireless communications network using a first radio access technology (RAT), wherein a connection between the user equipment and a second wireless communications network using a second RAT is placed into an idle state, wherein the second wireless communication network comprises a carrier network that does not support location services performed over the first wireless communications network; and
    participating in a control plane positioning process with the second wireless communications network during the voice call over the first wireless communications network.

2. The method of claim 1, wherein the connection using the second RAT between the user equipment and the second wireless communications network is placed into the idle state based on a preference set by a user of the user equipment, a preference set by the second wireless communications network, or a combination thereof.

3. The method of claim 1, wherein the first wireless communication network is a local network and the second wireless communication network is a wireless wide area network, and wherein participating in the control plane positioning process during the voice call over the local network further comprises:
    receiving a request from a wireless wide area network entity to participate in the control plane positioning process; and
    simultaneously exchanging one or more messages over a control channel as part of the control plane positioning process and participating in the voice call over the wireless local area network.

4. The method of claim 3, wherein the voice call is an emergency services voice call placed over the local network to a public safety access point, and a position of the user equipment determined from the control plane positioning process is communicated to the public safety access point.

5. The method of claim 1, wherein the user equipment does not support location services performed over the first wireless communications network.

6. The method of claim 1, wherein the user equipment exchanges one or more communications with a wireless wide area network location server of the carrier network as part of the control plane positioning process, and wherein the control plane positioning process is initiated by the wireless wide area network.

7. The method of claim 1, wherein the user equipment is a mobile telephone.

8. The method of claim 1, wherein the first wireless communications network is a local network comprising a wireless local area network (WLAN), a mesh network, a peer-to-peer network, a wireless wide area network small cell network, or any combination thereof.

9. A system for enabling positioning processes performed by user equipment, the system comprising:
    a memory; and
    a processor coupled with the memory configured to:
        initiate a voice call over a first wireless communications network using a first radio access technology (RAT), wherein a connection between the user equipment and a second wireless communications network using a second RAT is placed into an idle state, wherein the second wireless communication network comprises a carrier network that does not support location services performed over the first wireless communications network, and
        participate in a control plane positioning process with the second wireless communications network during the voice call over the first wireless communications network.

10. The system of claim 9, wherein the connection using the second RAT between the user equipment and the second wireless communications network is placed into the idle state based on a preference set by a user of the user equipment, a preference set by the second wireless communications network, or a combination thereof.

11. The system of claim 9, wherein the first wireless communication network is a local network and the second wireless communication network is a wireless wide area network, and wherein the processor configured to participate in the control plane positioning process during the voice call over the local network further comprises the processor configured to:
- receive a request from a wireless wide area network entity to participate in the control plane positioning process; and
- simultaneously exchange one or more messages over a control channel as part of the control plane positioning process and participating in the voice call over the wireless local area network.

12. The system of claim 11, wherein the voice call is an emergency services voice call placed over the local network to a public safety access point, and a position of the user equipment determined from the control plane positioning process is communicated to the public safety access point.

13. The system of claim 9, wherein the user equipment does not support location services performed over the first wireless communications network.

14. The system of claim 9, wherein the user equipment exchanges one or more communications with a wireless wide area network location server of the carrier network as part of the control plane positioning process, and wherein the control plane positioning process is initiated by the wireless wide area network.

15. The system of claim 9, wherein the user equipment is a mobile telephone.

16. The system of claim 9, wherein the first wireless communications network is a local network comprising a wireless local area network (WLAN), a mesh network, a peer-to-peer network, a wireless wide area network small cell network, or any combination thereof.

17. A non-transitory computer readable storage medium including instructions that, when executed by a processor, cause the processor to perform a method for enabling positioning processes performed by user equipment, the method comprising:
- initiating, by the user equipment, a voice call over a first wireless communications network using a first radio access technology (RAT), wherein a connection between the user equipment and a second wireless communications network using a second RAT is placed into an idle state, wherein the second wireless communication network comprises a carrier network that does not support location services performed over the first wireless communications network; and
- participating in a control plane positioning process with the second wireless communications network during the voice call over the first wireless communications network.

18. The non-transitory computer readable storage medium of claim 17, wherein the connection using the second RAT between the user equipment and the second wireless communications network is placed into the idle state based on a preference set by a user of the user equipment, a preference set by the second wireless communications network, or a combination thereof.

19. The non-transitory computer readable storage medium of claim 17, wherein the first wireless communication network is a local network and the second wireless communication network is a wireless wide area network, and wherein participating in the control plane positioning process during the voice call over the local network further comprises:
- receiving a request from a wireless wide area network entity to participate in the control plane positioning process; and
- simultaneously exchanging one or more messages over a control channel as part of the control plane positioning process and participating in the voice call over the wireless local area network.

20. The non-transitory computer readable storage medium of claim 19, wherein the voice call is an emergency services voice call placed over the local network to a public safety access point, and a position of the user equipment determined from the control plane positioning process is communicated to the public safety access point.

21. The non-transitory computer readable storage medium of claim 17, wherein the user equipment does not support location services performed over the first wireless communications network.

22. The non-transitory computer readable storage medium of claim 17, wherein the user equipment exchanges one or more communications with a wireless wide area network location server of the carrier network as part of the control plane positioning process, and wherein the control plane positioning process is initiated by the wireless wide area network.

23. The non-transitory computer readable storage medium of claim 17, wherein the user equipment is a mobile telephone.

24. A system, comprising:
- means for initiating a voice call over a first wireless communications network using a first radio access technology (RAT), wherein a connection between user equipment and a second wireless communications network using a second RAT is placed into an idle state, wherein the second wireless communication network comprises a carrier network that does not support location services performed over the first wireless communications network; and
- means for participating in a control plane positioning process with the second wireless communications network during the voice call over the first wireless communications network.

25. The system of claim 24, wherein the first wireless communication network is a local network and the second wireless communication network is a wireless wide area network, and wherein the means for participating in the control plane positioning process during the voice call over the local network further comprises:
- means for receiving a request from a wireless wide area network entity to participate in the control plane positioning process; and
- means for simultaneously exchanging one or more messages over a control channel as part of the control plane positioning process and participating in the voice call over the wireless local area network.

26. The system of claim 25, wherein the voice call is an emergency services voice call placed over the local network to a public safety access point, and a position of the user equipment determined from the control plane positioning process is communicated to the public safety access point.

* * * * *